US011150177B2

(12) United States Patent
Lu et al.

(10) Patent No.: US 11,150,177 B2
(45) Date of Patent: Oct. 19, 2021

(54) APPARATUS FOR TESTING A COEFFICIENT OF FRICTION AND METHODS FOR SAME

(71) Applicant: The Gillette Company LLC, Boston, MA (US)

(72) Inventors: Hong Lu, Falmouth, ME (US); Stephen Charles Witkus, Northbridge, MA (US); Marilyn Jeanne Westgate, Belmont, MA (US); Janelle Marie Parechanian, Revere, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/064,781

(22) Filed: Oct. 7, 2020

(65) Prior Publication Data

US 2021/0018427 A1 Jan. 21, 2021

Related U.S. Application Data

(62) Division of application No. 15/715,530, filed on Sep. 26, 2017, now Pat. No. 10,837,894.

(51) Int. Cl.
*G01N 19/02* (2006.01)
(52) U.S. Cl.
CPC .................. *G01N 19/02* (2013.01)

(58) Field of Classification Search
CPC ............................ G01N 19/00; G01N 19/02
See application file for complete search history.

(56) References Cited

U.S. PATENT DOCUMENTS

| 1,772,415 A | 8/1930 | Carpenter |
| 3,020,744 A | 2/1962 | Long |
| 10,837,894 B2 | 11/2020 | Lu et al. |
| 2014/0060149 A1 | 3/2014 | Alhusain et al. |

OTHER PUBLICATIONS

International Search Report and Written Opinion; Application Ser. No. PCT/US2018/051662; dated Dec. 4, 2018; 11 pages.
All Office Actions; U.S. Appl. No. 15/715,530.

*Primary Examiner* — Benjamin R Schmitt
(74) *Attorney, Agent, or Firm* — Joanne N. Pappas; Kevin C. Johnson

(57) ABSTRACT

An apparatus for testing a coefficient of friction of an article is provided. The apparatus includes a base, a ramp, and an actuator. The ramp includes a first rail and a second rail that are spaced apart by a first distance. The first and second rails cooperate to define a first travel path for the article. The actuator is coupled with the base and is operably coupled with the ramp to facilitate selective pivoting of the ramp between a first angular position and a second angular position.

6 Claims, 5 Drawing Sheets

APPARATUS FOR TESTING A COEFFICIENT OF FRICTION AND METHODS FOR SAME

FIELD OF INVENTION

The systems and method described below generally relate to a ramp that is tiltable to facilitate testing of a coefficient of friction between an article and the ramp.

BACKGROUND OF THE INVENTION

There are many different conventional methods and apparatuses that exist for testing the coefficient of friction between an article and the ramp. However, those conventional methods can be cumbersome and inexact.

SUMMARY OF THE INVENTION

In accordance with one embodiment, a method for testing a coefficient of friction between an article and a ramp is provided. The method comprises placing the article on a first travel path defined by the ramp when the ramp is at a first angular position, and tilting a distal end of the ramp upwardly and into a second angular position such that the article begins to slide down the ramp along the first travel path. The method further comprises calculating a coefficient of friction based on the difference between the first angular position and the second angular position, and placing the article on a second travel path defined by the ramp when the ramp is at the first angular position. The method still further comprises tilting the distal end of the ramp upwardly and into a third angular position such that the article begins to slide down the ramp along the second travel path, and calculating a coefficient of friction based on the difference between the first angular position and the third angular position.

BRIEF DESCRIPTION OF THE DRAWINGS

It is believed that certain embodiments will be better understood from the following description taken in conjunction with the accompanying drawings in which.

DETAILED DESCRIPTION OF THE INVENTION

Figure 1:
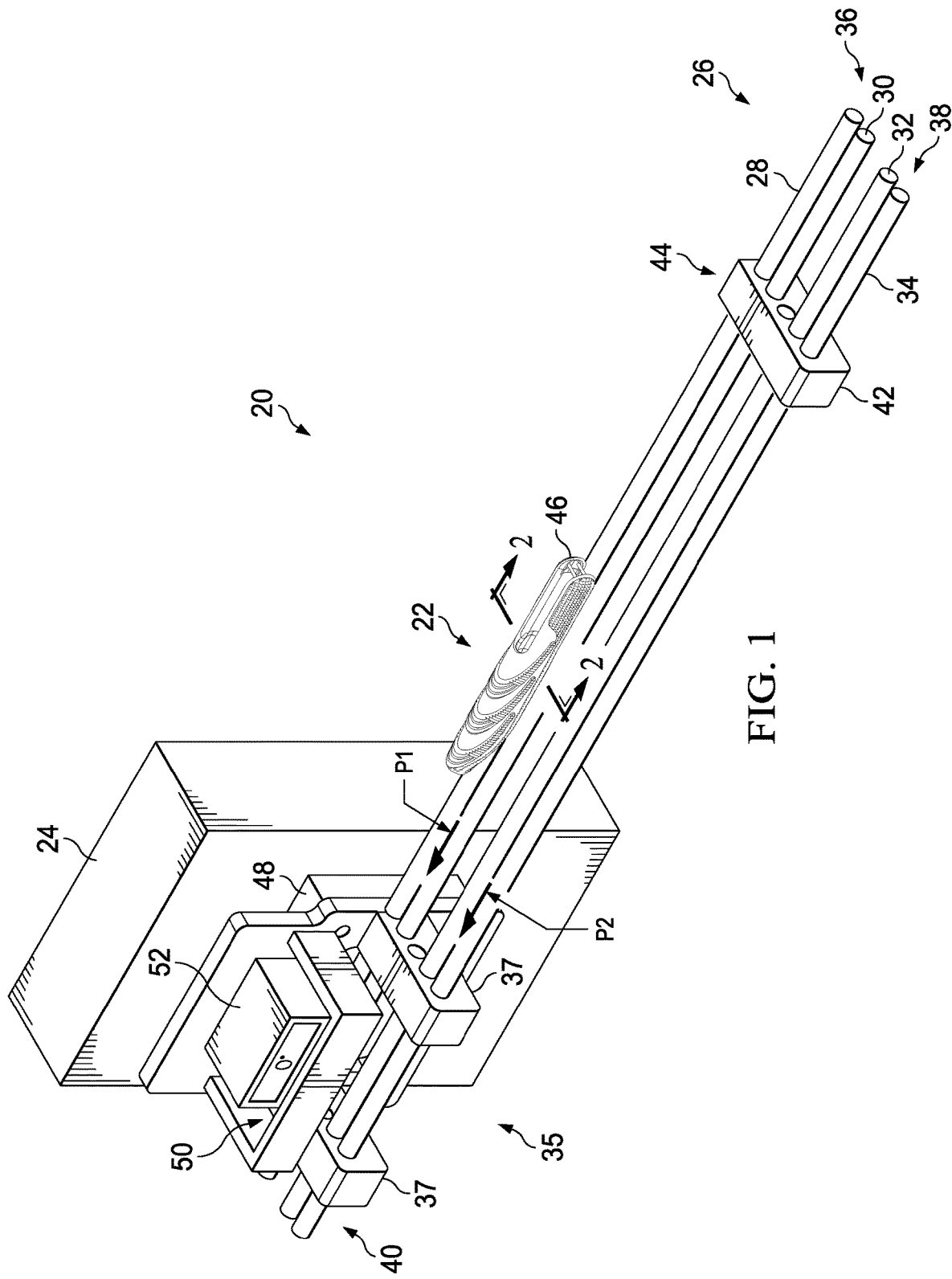
FIG. 1 is an isometric view depicting a testing apparatus that includes a ramp, in accordance with one embodiment.

In connection with the views and examples of FIGS. 1-5, wherein like numbers indicate the same or corresponding elements throughout the views, a testing apparatus 20 for testing a razor handle 22 is shown in FIG. 1 to include a base 24 and a ramp 26 that is pivotally coupled with the base 24. As will be described in further detail below, the razor handle 22 can be placed on the ramp 26 and the ramp 26 can be tilted to facilitate measuring of the coefficient of friction between the razor handle 22 and the ramp 26.

The ramp 26 can include four rails 28, 30, 32, 34 that are substantially parallel with one another and coupled to a mount member 35. The mount member 35 can comprise a pair of block members 37 that secures the rails 28, 30, 32, 34 together at a proximal end 40 of the ramp 26. An additional block member 42 can secure the rails 28, 30, 32, 34 together at a distal end 44 of the ramp 26. Each the rails 28, 30, 32, 34 can comprise an elongated tubular member. In one embodiment, the rails 28, 30, 32, 34 can be formed of a metal, such as stainless steel or aluminum, and can be either solid or hollow.

Two of the rails 28, 30 can form one rail pair 36 and another two of the rails 32, 34 can form another rail pair 38 that is adjacent to the rail pair 36. As illustrated in FIG. 1, the razor handle 22 can be provided on the rail pair 36 such that a grip 46 of the razor handle 22 contacts the rail pair 36. The rail pair 36 defines a travel path P1 for the razor handle 22. As will be described in further detail below, when the ramp 26 is pivoted to an elevated position, the razor handle 22 is free to slide along the rail pair 36 and along the travel path P1 to facilitate testing of a coefficient of friction between the grip 46 and the rail pair 36. The razor handle 22 can also be provided on the rail pair 38 such that the grip 46 contacts the rail pair 38. The rail pair 38 defines a travel path P2 for the razor handle 22 such that, when the ramp 26 is pivoted to an elevated position, the razor handle 22 is free to slide along the rail pair 38 and along the travel path P2 to facilitate testing of a coefficient of friction between the grip 46 and the rail pair 38.

Figure 2:
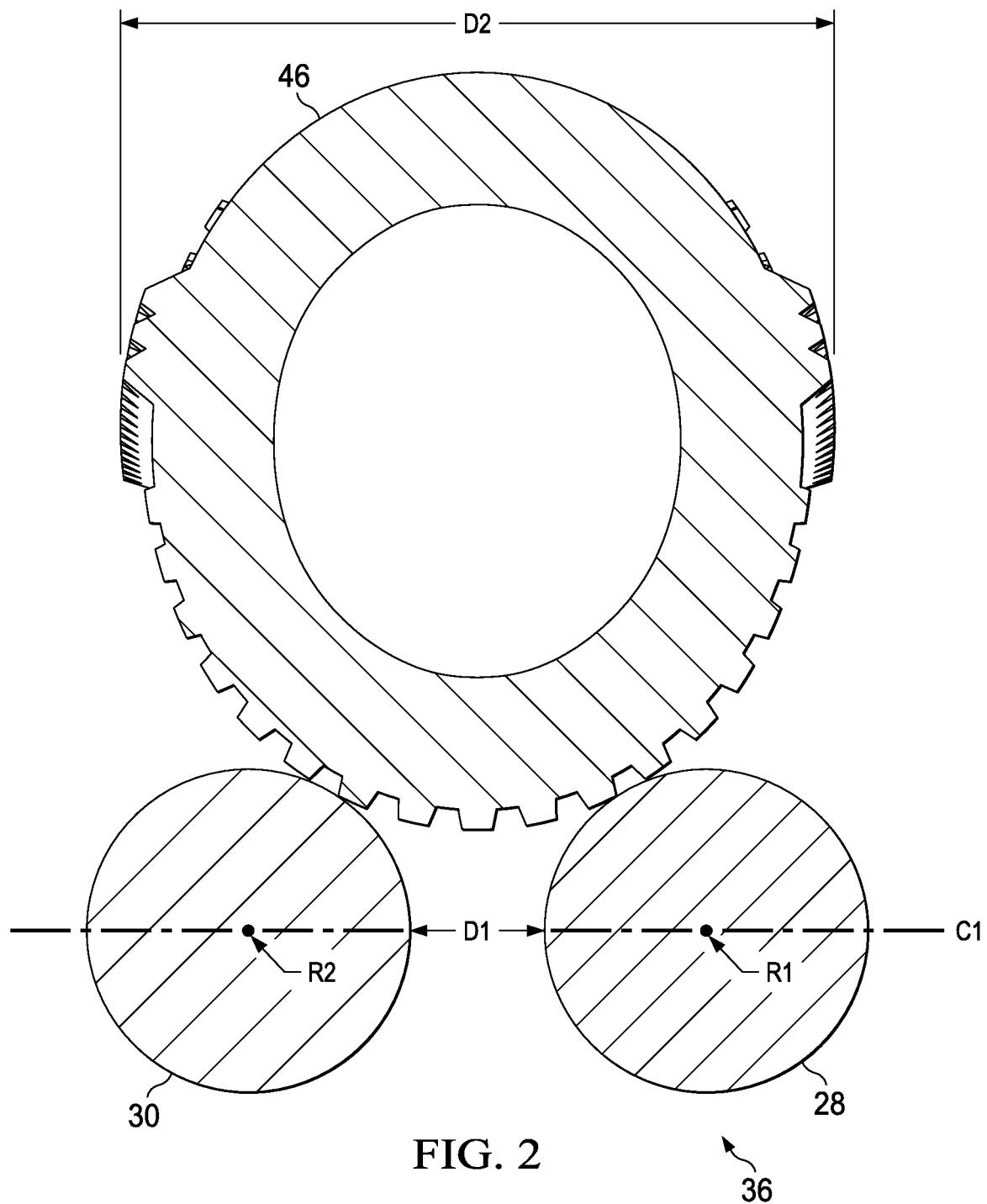
FIG. 2 is a cross sectional view taken along the line 2-2 of FIG. 1.

Referring now to FIG. 2, the razor handle 22 is shown to be resting on the rail pair 36 such that the grip 46 of the razor handle 22 contacts each of the rails 28, 30. The rails 28, 30 can be spaced apart by a distance D1. The grip 46 can have a diameter D2. The distance D1 between the rails 28, 30 can be small enough relative to the diameter D2 of the grip 46 to prevent the razor handle 22 from falling between the rails 28, 30. The distance D1 between the rails 28, 30 can also be small enough relative to the diameter D2 to provide underlying support for the razor handle 22 in such a manner that the razor handle 22 is positioned along an upper half of the rails 28, 30. For example, an imaginary centerline C1 is shown to extend through respective radii R1, R2 of the rails 28, 30 such that each of the rails 28, 30 are divided into an upper half (the portion of each of the rails 28, 30 that are disposed above the imaginary centerline C1) and a lower half (the portion of each of the rails 28, 30 that is disposed below the imaginary centerline C1). The distance D1 between the rails 28, 30 can be small enough relative to the diameter D2 razor handle 22 such that the grip 46 contacts the upper half of the rails 28, 30 and is vertically above the centerline C1. In one embodiment, the grip 46 can be spaced from the centerline C1 by about half of the distance D1. Positioning the razor handle 22 on the rails 28, 30 in this manner can allow for effective sliding of razor handle 22 along the rail pair 36 to facilitate testing of the coefficient of friction between the grip 46 and the rail pair 36, as will be described in further detail below.

In one embodiment, the diameter D2 can be greater than the first distance by a ratio of at least about 4 to about 1. For example, the distance D1 can be about 2.5 mm and 3 mm and the diameter D2 can be between about 12.2 mm and 13.3 mm. The rails 32, 34 of the rail pair 38 can be similar to, or the same as, the rails 28, 30, but arranged next to the rail pair 36. The rail pairs 36, 38 can be spaced apart from each other by a distance that is greater than distance D1 such that the razor handle is not mistakenly placed between the rail pairs 36, 38. The distance between the rail pairs 36, 38 can also be great enough to prevent razor handles (e.g., 22) provided simultaneously on each of the rail pairs 36, 38 from contacting each other during testing.

Figure 3:
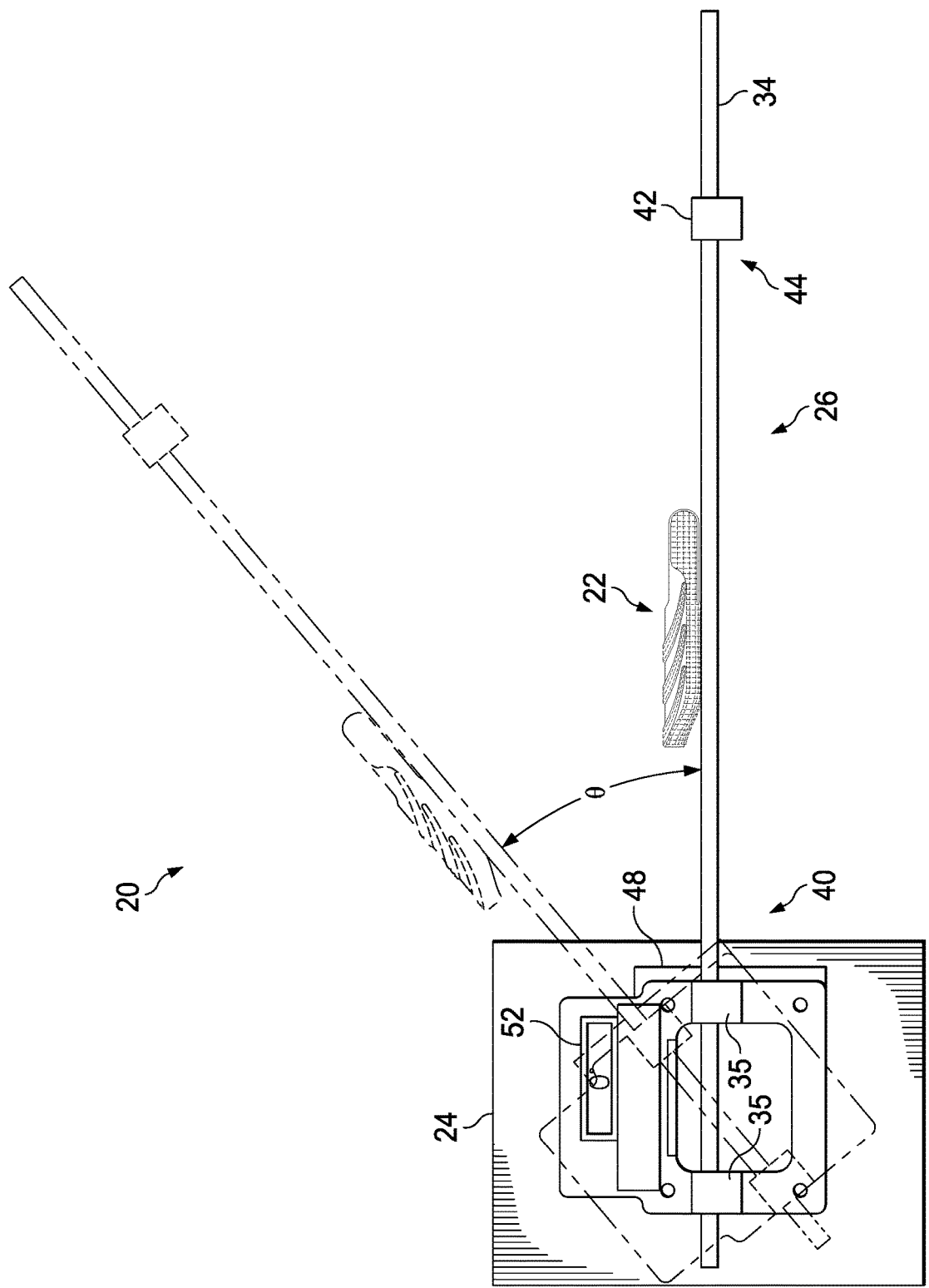
FIG. 3 is a side view of the testing apparatus of FIG. 1 with the ramp shown in each of a starting position and a final position.

Referring now to FIG. 3, the ramp 26 can be pivotable with respect to the base 24 between a starting position (shown in solid lines) and a final position (shown in dashed lines) to facilitate testing of the coefficient of friction between the grip 46 and the rail pairs 36, 38, as will be described in further detail below. In one embodiment, an electric motor 48 can be operably coupled with the base 24 and the ramp 26 and can facilitate powered pivoting of the ramp 26 with respect to the base 24. The electric motor 48 can be associated with a controller (not shown) that can control operation of the electric motor 48 to achieve certain testing parameters. The electric motor 48 can be a linear motor or any of a variety of suitable alternative actuators that facilitate powered pivoting of the ramp 26. In another embodiment, the ramp 26 can be manually pivoted (e.g., with a user's hand) with respect to the base 24.

Referring now to FIGS. 1-3, the testing apparatus 20 can include a compartment 50 that houses a digital gauge 52 that is configured to measure the angle of the ramp 26. As the ramp 26 is pivoted between the starting position and the final position, the digital gauge can display the angle of the ramp 26 to a user and/or can transmit the angle of the ramp 26 to a controller (not shown) for use in calculating a coefficient of friction. In another embodiment, the angle of the ramp 26 can be physically measured by a user.

When the razor handle 22 is placed on one of the rail pairs 36, 38 and the ramp 26 is tilted upwardly from the starting position, the coefficient of friction between the grip 46 and the underlying rail pair 36, 38 can affect how far the ramp 26 needs to be tilted before the razor handle 22 begins to slide down the ramp 26. The higher the coefficient of friction, the higher that the ramp 26 must be tilted to cause the razor handle 22 to slide down the ramp 26. The angle that the ramp 26 reaches when the razor handle begins to slide (e.g., the final position of the ramp 26) can be defined relative to the starting position as θ (see FIG. 3) and can be used to determine the coefficient of friction between the grip 46 and underlying rail pair 36, 38. In one embodiment, the follow equation can be used to determine the coefficient of friction:

$$\mu = \tan \theta$$

where μ is the coefficient of friction and θ is the angle of the ramp 26 in the final position relative to the starting position. In most embodiments, the starting position of the ramp 26 is substantially horizontal, but other starting positions are contemplated.

Figure 4:
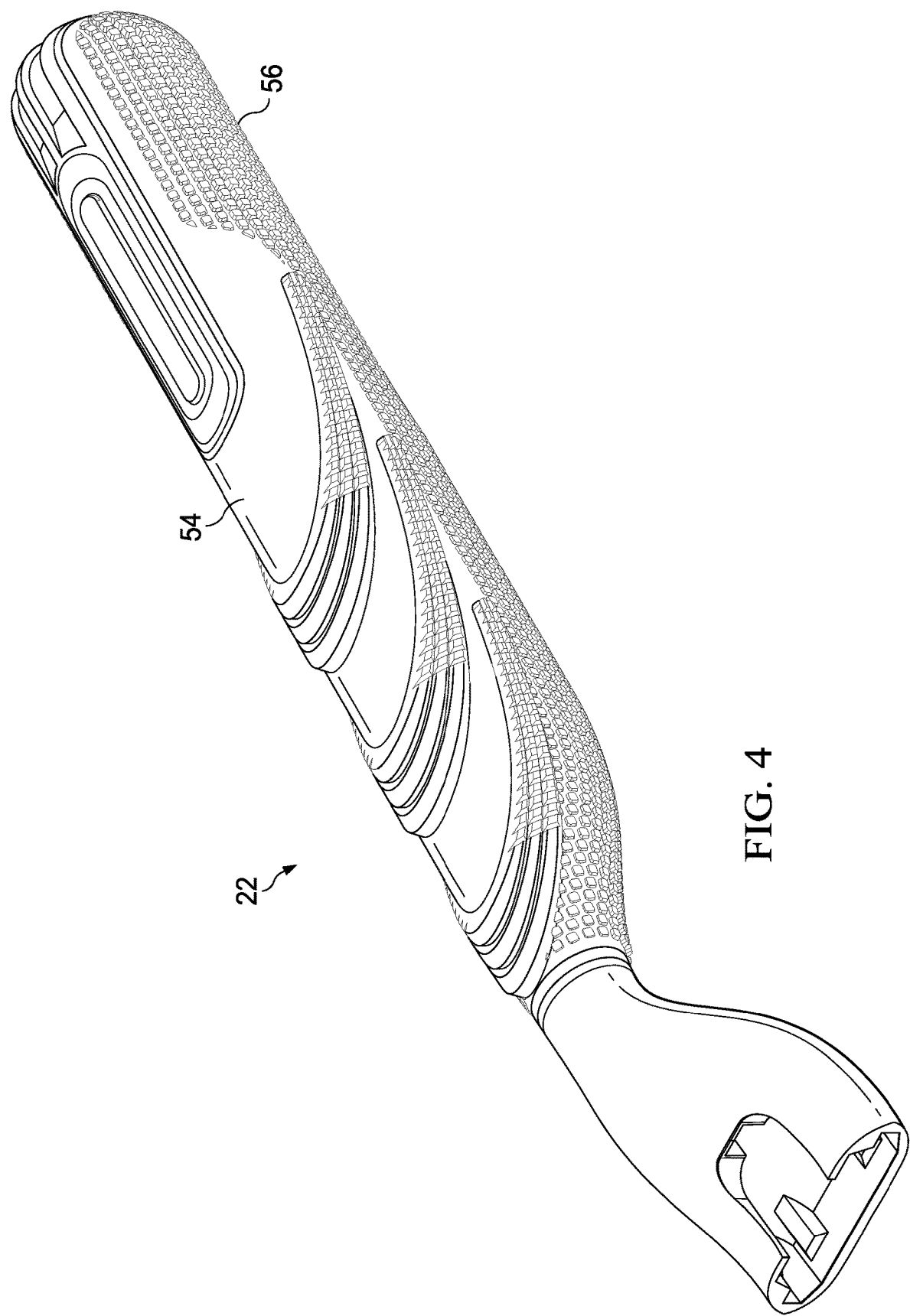
FIG. 4 is an isometric view of a razor handle for use with the testing apparatus.

The coefficient of friction of the grip 46 relative to the underlying rail pair 36, 38 can be affected by the material that is used to form the grip 46. As such, the testing apparatus 20 can be utilized to test different types of materials that are being considered for the grip 46 during development of the razor handle 22. Referring now to FIG. 4, the grip 46 of the razor handle 22 is shown to include a cover layer 54 that can at least partially surround an underlying rigid body (not shown). The cover layer 54 can include a plurality of projections 56 that can be substantially frusto-pyramidal shaped or any of a variety of suitable alternative shapes. When a user grasps the grip 46, the cover layer 54 can contact the user's hand and the projections 56 can cooperate with the user's hand to enhance the user's grip on the razor handle 22. The cover layer 54 can be formed of any of a variety of suitable materials and can be overmolded, or otherwise applied, to the body (not shown) in such a manner that the cover layer 54 is formed to the body (not shown). In one embodiment, the cover layer 54 can be comprised of an SEBS-based thermoplastic elastomer (TPE) that has a hardness of about 15-20 Shore A and is configured to adhere to ABS plastic. The TPE can encourage a user's gripping of the base portion 24 more effectively than other conventional razor handle arrangements. In some embodiments, the TPE can be configured to have substantially the same coefficient of friction when dry and when exposed to water. As will be described in further detail below, testing was conducted on various different materials for the cover layer 54 to facilitate selection of a material that encourages gripping by a user's hand but does not feel excessively sticky the touch.

A dry method of testing the razor handle 22 using the testing apparatus 20 will now be described. First, the ramp 26 can be provided in the starting position (e.g., a substantially horizontal position) and the razor handle 22 can be placed on one of the rail pairs 36, 38 between the block members 37, 42 and near the distal end 44 of the ramp 26 (e.g., in a home position). The distal end 44 of the ramp 26 can then be tilted upwardly and away from the starting position until the razor handle 22 begins to slide down the ramp 26 towards the proximal end 40. Once the razor handle 22 begins to slide down the ramp 26 (i.e., the ramp 26 is the final position), the angle θ of the ramp 26 is measured and is then used to calculate the coefficient of friction of that razor handle 22/rail pair 36, 38 combination. The ramp 26 is then returned to the starting position and the razor handle 22 is placed on the other rail pair 36, 38 in the home position. The distal end 44 of the ramp 26 is then tilted upwardly again until the razor handle 22 begins to slide down the ramp 26 towards the proximal end 40 (i.e., the ramp 26 is in the final position). The angle θ of the ramp 26 is then measured and is used to calculate the coefficient of friction of that razor handle 22/rail pair 36, 38 combination. It is to be appreciated that although the testing of an individual razor handle 22 on the testing apparatus 20 is described, a pair of substantially identical or identical razor handles (e.g., 22) can be tested simultaneously on the testing apparatus 20.

It is to be appreciated that by testing the same razor handle 22 on both rail pairs 36, 38, any inconsistencies between the different rail pairs 36, 38 can be accounted for. It is also to be appreciated that the testing method can be repeated on the razor handle 22 until a desired sample size of coefficients of friction (e.g., data points) has been collected. An average and standard deviation of those data points can then be calculated.

In one embodiment, prior to placing the razor handle 22 on the rail pairs 36, 38, the rail pairs 36, 38 can be coated with a lubricant to simulate the different environments to which the razor handle might be exposed (i.e., when a user is shaving in the shower). The testing of the razor handle 22 with lubricant can be in addition to, or alternative to, the dry method explained above.

A method of comparing the razor handle 22 to a different razor handle using the testing apparatus 20 will now be described. First, when the ramp 26 is in the starting position (e.g., substantially horizontal), the razor handle 22 is placed on one of the rail pairs 36, 38 and a different razor handle (not shown) is placed on the other of the rail pairs 36, 38. The distal end 44 of the ramp 26 is then tilted upwardly until the one of the razor handles begins to slide down the ramp 26 towards the proximal end 40 (i.e., the ramp 26 reaches the final position). The angle θ of the ramp 26 is measured and the distal end 44 of the ramp 26 is then tilted further upwardly until the other razor handle begins to slide down the ramp 26 towards the proximal end 40. The angle θ of the ramp 26 is again measured, then both measured angles are used to calculate the coefficient of friction between the razor handles and the respective underlying rail pair 36, 38. It is to be appreciated that the testing method can be repeated on the different razor handles until a desired sample size of coefficients of friction (e.g., data points) has been collected. An average and standard deviation of those data points can then be calculated.

In one embodiment, the method of comparing two different razors described above can be used in a commercial setting to demonstrate, in real time, to a consumer, how the razor handle 22 performs relative to another razor handle (e.g., a competitor product). In such an embodiment, the testing apparatus 20 can be provided as part of a retail display. The razor handle 22 can be provided on one of the rail pairs 36, 38 and the other razor handle can be provided on the other rail pair 36, 38. The razor handles can initially be provided at the distal end 44 of the ramp 26 (e.g., in a home position) and the ramp 26 can initially be provided in the starting position. The ramp 26 can automatically be tilted upwardly such that the other razor handle begins to slide down the ramp before the razor handle 22 thereby demonstrating the effectiveness of the grip 46 of the razor handle 22 relative to the other razor handle. The ramp 26 can then return to the starting position and the razor handles can be returned to their home positions and the demonstration can be started again. In one embodiment, the testing apparatus 20 can include a return mechanism (not shown) that pushes the razor handles into their home positions after completion of the demonstration. In another embodiment, the distal end 44 of the ramp 26 can be lowered below the starting position (e.g., below horizontal) to allow the razor handles to slide back to their home positions.

Figure 5:
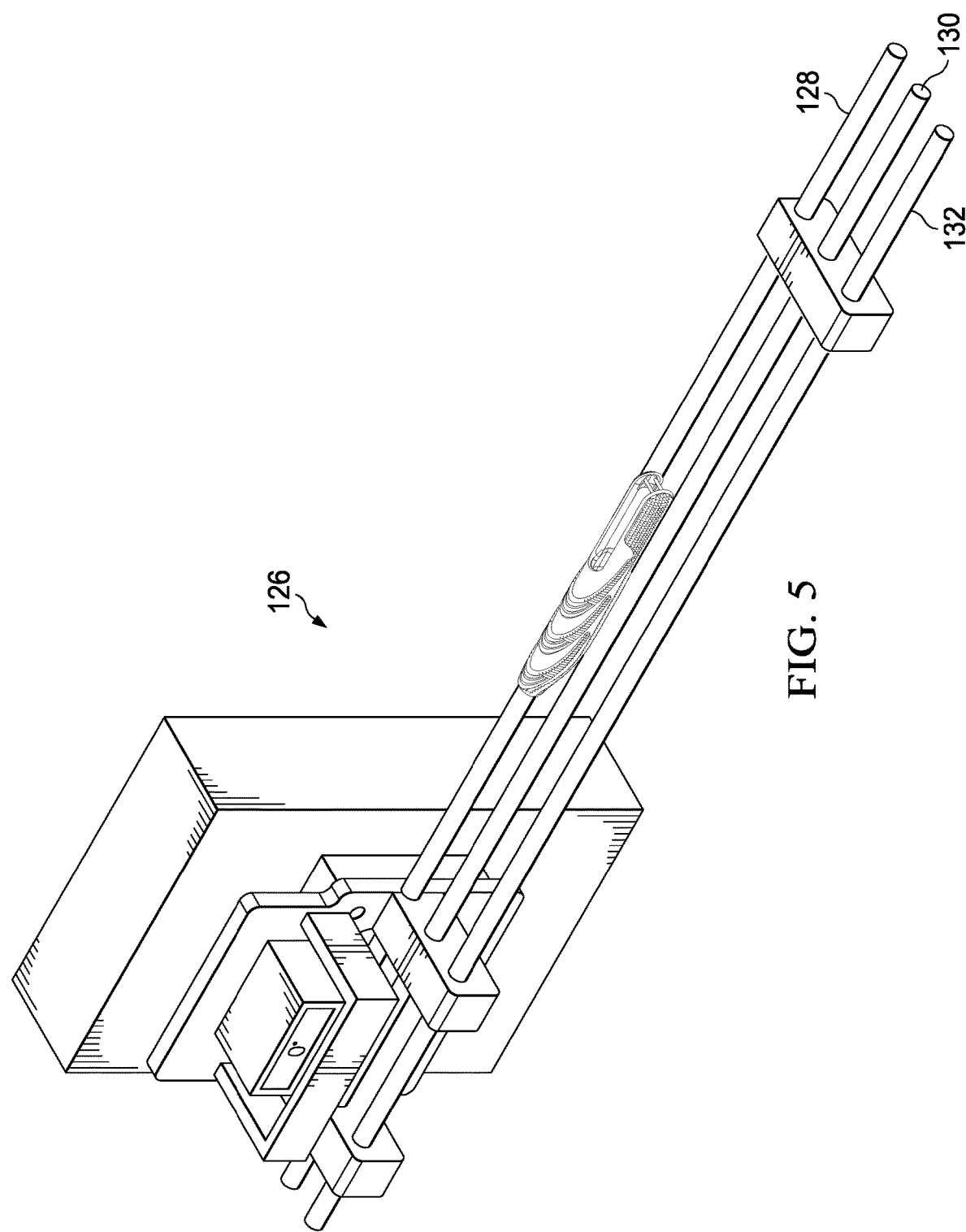
FIG. 5 is an isometric view of a ramp according to another embodiment.

An alternative embodiment of a ramp 126 is illustrated in FIG. 5. The ramp 126 is similar to, or the same in many respects as, the ramp 26 illustrated in FIGS. 1-3. However, the ramp 126 can include three rails 128, 130, 132 instead of four. The rail 130 can be a common rail such that the rails 128, 130 define one rail pair and rails 130, 132 define another rail pair.

EXAMPLES

Testing was conducted on seven different materials for the cover layer 54 using the testing apparatus described above. Those materials are identified in the table below as Materials #1-#7 and comprise white colored thermoplastic elastomer material (Material #1), black colored thermoplastic elastomer (Material #2), Experimental thermoplastic elastomer material on steel rod (Material #3), Venus Embrace thermoplastic material on steel rod (Material #4), Venus Embrace thermoplastic material over-molded on razor (Material #5), Venus Embrace thermoplastic material over molded on razor (Material #6), and Experimental thermoplastic elastomer material over-molded on razor (Material #7). Five separate tests were performed for each material. For each test, a razor handle (e.g., 22) having a cover layer 54 comprised of the material was provided on each rail pair 36, 38 and tested using the dry method described above to measure the coefficient of friction of the material of the cover layer 54. The results of those tests are as follows:

| Material #5 | Rail 1 | Rail 2 |
|---|---|---|
| Test #1 | 58.6 | 59.5 |
| Test #2 | 57.3 | 62 |
| Test #3 | 58 | 61.5 |

-continued

| Material #5 | Rail 1 | Rail 2 |
|---|---|---|
| Test #4 | 58.5 | 60.5 |
| Test #5 | 59 | 60.2 |
| Average | 58.28 | 60.74 |
| Std. Dev. | 0.65 | 1.01 |

| Material #1 | Rail 1 | Rail 2 |
|---|---|---|
| Test #1 | 21.7 | 20.1 |
| Test #2 | 23 | 19.5 |
| Test #3 | 22 | 20.1 |
| Test #4 | 19.9 | 21.1 |
| Test #5 | 20.4 | 20.3 |
| Average | 21.40 | 20.22 |
| Std. Dev. | 1.25 | 0.58 |

| Material #2 | Rail 1 | Rail 2 |
|---|---|---|
| Test #1 | 25.5 | 25.7 |
| Test #2 | 24.8 | 26.3 |
| Test #3 | 26.1 | 26.7 |
| Test #4 | 26.3 | 26 |
| Test #5 | 26.3 | 27.8 |
| Average | 25.80 | 26.50 |
| Std. Dev. | 0.65 | 0.82 |

| Material #6 | Rail 1 | Rail 2 |
|---|---|---|
| Test #1 | 69.5 | 69.4 |
| Test #2 | 70 | 69.8 |
| Test #3 | 69.4 | 69.7 |
| Test #4 | 66.9 | 69.5 |
| Test #5 | 69.3 | 70 |
| Average | 69.02 | 69.68 |
| Std. Dev. | 1.22 | 0.24 |

| Material #7 | Rail 1 | Rail 2 |
|---|---|---|
| Test #1 | 66.1 | 67.3 |
| Test #2 | 66 | 67.1 |
| Test #3 | 66.7 | 68.1 |
| Test #4 | 67.1 | 68.1 |
| Test #5 | 67.5 | 67.3 |
| Average | 66.68 | 67.58 |
| Std. Dev. | 0.64 | 0.48 |

| Material #3 | Rail 1 | Rail 2 |
|---|---|---|
| Test #1 | 70.2 | 71.3 |
| Test #2 | 71.7 | 73.4 |
| Test #3 | 69.3 | 72.2 |
| Test #4 | 70.6 | 71.8 |
| Test #5 | 71.5 | 72.3 |
| Average | 70.66 | 72.20 |
| Std. Dev. | 0.98 | 0.78 |

| Material #4 | Rail 1 | Rail 2 |
|---|---|---|
| Test #1 | 73 | 70.9 |
| Test #2 | 72.9 | 69.5 |
| Test #3 | 73 | 71.1 |
| Test #4 | 71.3 | 70 |
| Test #5 | 70.3 | 70.5 |
| Average | 72.10 | 70.40 |
| Std. Dev. | 1.24 | 0.66 |

Examples/Combinations

A. A method for testing a coefficient of friction of an article, the method comprising:
placing the article on a first travel path defined by a ramp when the ramp is at a first angular position;
tilting a distal end of the ramp upwardly and into a second angular position such that the article begins to slide down the ramp along the first travel path;
calculating a coefficient of friction between the article and the ramp based on the difference between the first angular position and the second angular position;
placing the article on a second travel path defined by the ramp when the ramp is at the first angular position;
tilting the distal end of the ramp upwardly and into a third angular position such that the article begins to slide down the ramp along the second travel path;
calculating a coefficient of friction between the article and the ramp based on the difference between the first angular position and the third angular position.

B. The method of Paragraph A further comprising:
applying a lubricant to at least a portion of the first travel path and at least a portion of the second travel path;
placing the article on the first travel path when the ramp is at the first angular position;
tilting the distal end of the ramp upwardly and into a fourth angular position such that the article begins to slide down the ramp along the first travel path;
calculating a coefficient of friction between the article and the ramp based on the difference between the first angular position and the fourth angular position;
placing the article on the second travel path when the ramp is at the first angular position;
tilting the distal end of the ramp upwardly and into a fifth angular position such that the article begins to slide down the ramp along the second travel path; and
calculating a coefficient of friction between the article and the ramp based on the difference between the first angular position and the fifth angular position.

C. The method of Paragraph B wherein the lubricant comprises at least one of water, soap, and a shaving cream.

D. The method of any of Paragraphs A-C further comprising:
applying a lubricant to at least a portion of the article;
placing the article on the first travel path when the ramp is at the first angular position;
tilting the distal end of the ramp upwardly and into a fourth angular position which is such that the article begins to slide down the ramp along the first travel path;
calculating a coefficient of friction between the article and the ramp based on the difference between the first angular position and the fourth angular position;
placing the article on the second travel path when the ramp is at the first angular position;
tilting the distal end of the ramp upwardly and into a fifth angular position such that the article begins to slide down the ramp along the second travel path; and
calculating a coefficient of friction between the article and the ramp based on the difference between the first angular position and the fifth angular position.

E. The method of Paragraph D wherein the lubricant comprises at least one of water, soap, and a shaving cream.

F. The method of any of Paragraphs A-E wherein:
the ramp comprises a first rail, a second rail, and a third rail that each extends longitudinally;
the first rail and the second rail cooperate to define the first travel path; and
the second rail and the third rail cooperate to define the second travel path.

G. The method of Paragraph A further comprising detecting one or more of the first angular position, the second angular position, and the third angular position with a digital angle gauge.

H. A method for comparing a coefficient of friction of each of a first article and a second article, wherein the first article is formed of a first material and the second article is formed of a second material that is different from the first material, the method comprising:
placing the first article on a first travel path defined by a ramp when the ramp is at a first angular position;
tilting a distal end of the ramp upwardly into a second angular position such that the article begins to slide down the ramp along the first travel path;
placing the first article on a second travel path defined by the ramp when the ramp is at the first angular position;
tilting the distal end of the ramp upwardly into a third angular position such that the first article begins to slide down the ramp along the second travel path;
placing the second article on the first travel path defined by the ramp when the ramp is at the first angular position;
tilting the distal end of the ramp upwardly into a fourth angular position such that the second article begins to slide down the ramp along the first travel path;
placing the second article on the second travel path defined by the ramp when the ramp is at the first angular position;
tilting the distal end of the ramp upwardly into a fifth angular position such that the second article begins to slide down the ramp along the second travel path;
calculating a first average coefficient of friction for the first article based on the first angular position, the second angular position, and the third angular position; and
calculating a second average coefficient of friction for the second article based on the first angular position, the fourth angular position, and the fifth angular position.

I. The method of Paragraph H further comprising, prior to placing the first article on a first travel path, applying a lubricant to at least a portion of the first travel path and at least a portion of the second travel path.

J. The method of Paragraph I wherein the lubricant comprises at least one of water, soap, and a shaving cream.
K. The method of any of Paragraphs H-J further comprising, prior to placing the first article on a first travel path, applying a lubricant to at least a portion of each of the first article and the second article.
L. The method of Paragraph K wherein the lubricant comprises at least one of water, soap, and a shaving cream.
M. The method of any of Paragraphs H-L wherein the first article and the second article each comprise a razor handle.
N. A combination comprising:
    an article comprising a body that defines a first diameter; and
    an apparatus for testing a coefficient of friction of the article, the apparatus comprising:
    a base;
    a ramp that comprises a first rail and a second rail that are spaced apart by a first distance and cooperate to define a first travel path for the article; and
    an actuator coupled with the base and operably coupled with the ramp to facilitate selective pivoting of the ramp between a first angular position and a second angular position; wherein:
        the first diameter is greater than the first distance by a ratio of at least about 4 to about 1; and
        the first rail and the second rail cooperate to provide underlying support for the article and to facilitate selective sliding of the article with respect to the ramp along the first travel path.
O. The combination of Paragraph N wherein:
    the ramp comprises a third rail and a fourth rail that are spaced apart by a second distance and cooperate to define a second travel path for the article;
    the first diameter is greater than the second distance by a ratio of at least about 4 to about 1; and
    the third rail and the fourth rail cooperate to provide underlying support for the article and to facilitate selective sliding of the article with respect to the ramp along the second travel path.
P. The combination of any of Paragraphs N-O wherein the actuator comprises an electric motor.
Q. The combination of any of Paragraphs N-P further comprising a digital angle gauge configured to measure an angular position of the ramp.
R. The combination of any of Paragraphs N-Q further comprising a lubricant disposed on at least a portion of each of the first rail and the second rail.
S. The combination of any of Paragraphs N-R wherein the article comprises a razor handle.
T. The combination of any of Paragraphs N-S wherein the body of the razor handle is formed at least partially of a material that prevents sliding of the razor handle along the first travel path until the second angular position of the ramp is greater than about 55 degrees relative to the first angular position.
U. The combination of any of Paragraphs N-T wherein the material comprises a thermoplastic elastomer.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

All parts, ratios, and percentages herein, in the Specification, Examples, and Claims, are by weight and all numerical limits are used with the normal degree of accuracy afforded by the art, unless otherwise specified.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the DETAILED DESCRIPTION are, in the relevant part, incorporated herein by reference; the citation of any document is not to be construed as an admission that it is prior art with respect to the present disclosure. To the extent that any meaning or definition of a term or in this written document conflicts with any meaning or definition in a document incorporated by reference, the meaning or definition assigned to the term in this written document shall govern. Except as otherwise noted, the articles "a," "an," and "the" mean "one or more."

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. In some embodiments, the drawings can be understood to be drawn to scale. The scope of the disclosure is, of course, not limited to the examples or embodiments set forth herein, but can be employed in any number of applications and equivalent devices by those of ordinary skill in the art. Rather it is hereby intended the scope of the disclosure be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for comparing a coefficient of friction of each of a first article and a second article, wherein the first article is formed of a first material and the second article is formed of a second material that is different from the first material, the method comprising:
    placing the first article on a first travel path defined by a ramp when the ramp is at a first angular position;
    tilting a distal end of the ramp upwardly into a second angular position such that the article begins to slide down the ramp along the first travel path;
    placing the first article on a second travel path defined by the ramp when the ramp is at the first angular position;
    tilting the distal end of the ramp upwardly into a third angular position such that the first article begins to slide down the ramp along the second travel path;

placing the second article on the first travel path defined by the ramp when the ramp is at the first angular position;

tilting the distal end of the ramp upwardly into a fourth angular position such that the second article begins to slide down the ramp along the first travel path;

placing the second article on the second travel path defined by the ramp when the ramp is at the first angular position;

tilting the distal end of the ramp upwardly into a fifth angular position such that the second article begins to slide down the ramp along the second travel path;

calculating a first average coefficient of friction for the first article based on the first angular position, the second angular position, and the third angular position; and calculating a second average coefficient of friction for the second article based on the first angular position, the fourth angular position, and the fifth angular position.

2. The method of claim 1 further comprising, prior to placing the first article on a first travel path, applying a lubricant to at least a portion of the first travel path and at least a portion of the second travel path.

3. The method of claim 2 wherein the lubricant comprises at least one of water, soap, and a shaving cream.

4. The method of claim 1 further comprising, prior to placing the first article on a first travel path, applying a lubricant to at least a portion of each of the first article and the second article.

5. The method of claim 4 wherein the lubricant comprises at least one of water, soap, and a shaving cream.

6. The method of claim 1 wherein the first article and the second article each comprise a razor handle.

* * * * *